US006578199B1

(12) United States Patent
Tsou et al.

(10) Patent No.: US 6,578,199 B1
(45) Date of Patent: Jun. 10, 2003

(54) AUTOMATIC TRACKING SYSTEM AND METHOD FOR DISTRIBUTABLE SOFTWARE

(75) Inventors: I-Wen Tsou, Palo Alto, CA (US); Hirokatsu Araki, Cupertino, CA (US); Tsuyoshi Hirao, San Jose, CA (US); Tadashi Takahashi, Kawasaki (JP); Toshiharu Kido, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/441,155

(22) Filed: Nov. 12, 1999

(51) Int. Cl.⁷ .............................................. G06F 9/445
(52) U.S. Cl. ........................ 717/178; 717/174; 717/177; 717/178
(58) Field of Search .......................... 717/177, 172, 717/168, 167, 173, 174, 176, 178; 707/203, 511; 709/213, 216, 217

(56) References Cited

U.S. PATENT DOCUMENTS

| 5,103,476 A | | 4/1992 | Waite et al. ................... 380/4 |
| 5,495,610 A | * | 2/1996 | Shing et al. ................. 709/221 |
| 5,649,187 A | * | 7/1997 | Hornbuckle ................. 707/10 |
| 5,684,951 A | | 11/1997 | Goldman et al. ...... 395/188.01 |
| 5,708,709 A | | 1/1998 | Rose ............................ 380/4 |
| 5,745,766 A | | 4/1998 | Bramnick et al. .......... 395/703 |
| 5,758,069 A | | 5/1998 | Olsen .................... 395/187.01 |
| 5,790,664 A | | 8/1998 | Coley et al. .................... 380/4 |
| 5,790,785 A | | 8/1998 | Klug et al. ............ 395/188.01 |
| 5,819,285 A | | 10/1998 | Damico et al. ............. 707/104 |
| 5,845,070 A | | 12/1998 | Ikudome ................ 395/187.01 |
| 5,845,077 A | * | 12/1998 | Fawcett ....................... 709/221 |
| 5,852,714 A | | 12/1998 | Tseng et al. ........... 395/187.01 |

(List continued on next page.)

FOREIGN PATENT DOCUMENTS

WO  WO 00/68851 A2 * 11/2000 ........... G06F/17/60

OTHER PUBLICATIONS

Hooper et al, "Distributed software prototyping with ADS", IEEE, pp 216–223, 1985.*
Avrunin et al, "Describing and anlyzing distributed software system designs" ACM Trans. Prog. Lang. & Sys. vol. 7, No. 3, pp 380–403.*
Dwarkadas et al., Evaluation of release consistent software distributed shared memory on emerging network technology, IEEE, pp 144–155, 1993.*
Amza et al., "Tradeoffs between false sharing and aggregation in software distributed shared memory", ACM PPoPP, pp 90–99, 1997.*

Primary Examiner—Anil Khatri
(74) Attorney, Agent, or Firm—Sheppard Mullin Richter & Hampton LLP

(57) ABSTRACT

A method and apparatus for tracking the use of a distributable software application uses two identification codes and a tracking assistant to monitor the operation and distribution of the software application. A first code is preferably a downloaded identification code created when the user accesses a web server. The first identification code and other registration data is stored in a database coupled to the web server. A second unique installation code is automatically created when the software application is installed in the user's computer. Subsequent installations of the application using the same first code results in a different installation code. The tracking assistant module automatically transmits both codes to a database via a network (Internet) according to a predetermined schedule. One embodiment of the tracking assistant also collects other data on the use of the application, such as frequency of use or features commonly used, and transmits it along with the two codes as tracking data. A tracking data analyzer is preferably coupled to the database to determine if unauthorized use of the application is occurring or to assist in providing individual customer support and service functions.

34 Claims, 8 Drawing Sheets

U.S. PATENT DOCUMENTS

| | | | | |
|---|---|---|---|---|
| 5,903,721 | A | | 5/1999 | Sixtus .................. 395/187.01 |
| 5,909,023 | A | | 6/1999 | Ono et al. .................. 253/380 |
| 5,910,987 | A | | 6/1999 | Ginter et al. ................. 380/24 |
| 5,919,247 | A | | 7/1999 | Van Hoff et al. ........... 709/217 |
| 5,925,127 | A | | 7/1999 | Ahmad ...................... 713/200 |
| 6,009,401 | A | * | 12/1999 | Hortsmann .................... 705/1 |
| 6,009,525 | A | * | 12/1999 | Hortsmann ................ 713/200 |
| 6,014,651 | A | * | 1/2000 | Crawford .................... 705/400 |
| 6,192,518 | B1 | * | 2/2000 | Neal .......................... 717/175 |
| 6,067,416 | A | * | 5/2000 | Fraser ....................... 717/178 |
| 6,151,643 | A | * | 11/2000 | Cheng et al. ................. 710/36 |
| 6,189,146 | B1 | * | 3/2001 | Misra et al. ................. 717/177 |
| 6,199,204 | B1 | * | 3/2001 | Donohue .................... 717/178 |
| 6,202,070 | B1 | * | 3/2001 | Nguyen et al. ............. 707/104 |
| 6,202,207 | B1 | * | 3/2001 | Donohue .................... 717/173 |
| 6,247,128 | B1 | * | 6/2001 | Fisher et al. ................ 713/100 |
| 6,308,061 | B1 | * | 10/2001 | Criss et al. ................. 455/418 |
| 6,418,472 | B1 | * | 7/2002 | Mi et al. .................... 709/229 |
| 6,446,260 | B1 | * | 9/2002 | Wilde et al. ................ 717/173 |

* cited by examiner

AUTOMATIC TRACKING SYSTEM AND METHOD FOR DISTRIBUTABLE SOFTWARE

FIELD OF THE INVENTION

The present invention relates generally to monitoring and controlling the use of distributed software. More particularly, the present invention is directed to a method and apparatus for tracking the use of software downloaded from a network, such as the Internet.

BACKGROUND OF THE INVENTION

Computer users have many options for obtaining computer software. They can buy "floppy disks" or "compact disks" containing software applications which they load onto the hard drive of their computer or computer network. With the advent of the Internet, computer users now have the option of acquiring computer software by downloading software modules from a web site on the world wide web. In particular, it is possible to use the Internet to download software from a remote server.

The increasing popularity of downloaded software creates new opportunities for computer software vendors. Like other forms of e-commerce, the convenience associated with a user being able to acquire software from the Internet has the potential to increase sales. Users may also download free limited-use software, so called "shareware." These limited use software modules promote the sales of full-function software packages.

Unfortunately, the Internet also creates new challenges for software vendors. One challenge for software vendors is preventing unauthorized copying and sharing of software. Unauthorized copying or other misuse of downloaded software in violation of copyright laws reduces potential licensing revenues. Additionally, the illicit sharing of corrupted software by third parties may tarnish a company's image. For example, unauthorized copies of software applications which are corrupted such that the application frequently crashes or performs poorly may harm the reputation of the software vendor.

Conventional systems for the management of licensed software have several drawbacks. Generally speaking, there are several main approaches to licensing downloaded software. One approach is for the software vendor to issue an identification code to the user which may must be entered by the user to permit the user to download the application or enable the use of the downloaded application. Another approach involves adding a monitoring and control program to the software application that automatically terminates the operation of the downloaded software after a predetermined length of time or a predetermined number of uses.

Conventional methods to prevent the unauthorized use of downloaded software are more complicated and less user-friendly than desired. In many cases comparatively complex copy control software is required to prevent hackers from illicitly copying the software. Additionally, in some systems authorization codes may be shared by different users, thwarting the licensing system.

Another challenge for software vendors is to efficiently provide customer service and support for downloaded software. Computer users who purchase downloaded software often do not bother to fill out conventional registration cards or survey forms. Additionally, the vendor typically has no direct personal interaction with individual computer users prior to and subsequent to the sale of the software. This makes it difficult for the software vendor to determine whether users are receiving adequate support to properly use their software.

Still another challenge for software vendors is acquiring the quantity and quality of data on the use of their product required to improve the quality of their product and to efficiently focus their marketing efforts. Software vendors desire to know how many copies of each application are actually used, how often and how long each user uses their software application, what features are most valuable to users, and other types of demographic data. However, it can be expensive and difficult for software vendors to obtain accurate data which would assist them to improve their products or to more efficiently focus their marketing efforts.

What is desired is a new apparatus and method to permit the use of software to be automatically monitored and optionally controlled.

SUMMARY OF THE INVENTION

The present invention is directed towards an apparatus and method for monitoring and optionally controlling the use of distributed software, particularly software downloaded from a remote server, such as a server which is present on the Internet. The apparatus of the present invention generally comprises: (a) a server for providing a software program to be downloaded from a remote server, the server configured to generate a first identification code in response to a request by a user to download a software application; (b) a downloadable installer contained within the server for installing downloaded software in a user's computer in response to the user providing the first identification code and registration data, the installer including: (i) a software application program; and (ii) a tracking assistant for transmitting tracking data indicative of the operation of the application program in the computer; the installer generating a second identification code when the application is installed in the user's computer; and (c) a database coupled to the server for storing the tracking data; wherein said tracking data transmitted by said tracking assistant module includes said first and said second identification codes.

One object of the present invention is a method to monitor use of a software application. In a preferred embodiment, the software application is downloaded from the Internet.

Another object of the present invention is a method to provide customer support for downloaded software applications.

Still another object of the present invention is a method to automatically create demographic data on software use.

Yet still another object of the present invention is a method to automatically create registration data for downloaded software applications.

DETAILED DESCRIPTION OF THE INVENTION

The present invention is generally directed towards an apparatus and method for automatically tracking the use of software, particularly downloaded software. There is a need for a cost efficient means to perform tracking, customer product support, service, and research functions. Consumers who download software typically lack a strong incentive to cooperate with traditional customer satisfaction assessment techniques such as filling out registration cards or consumer surveys. Moreover, when such registration cards or surveys are completed the information is not always reliable and cannot be used to assess the actual product usage. It can be time consuming, expensive, and difficult for software vendors to obtain the type of usage information required to improve their product lines and to provide effective customer support.

Figure 1:
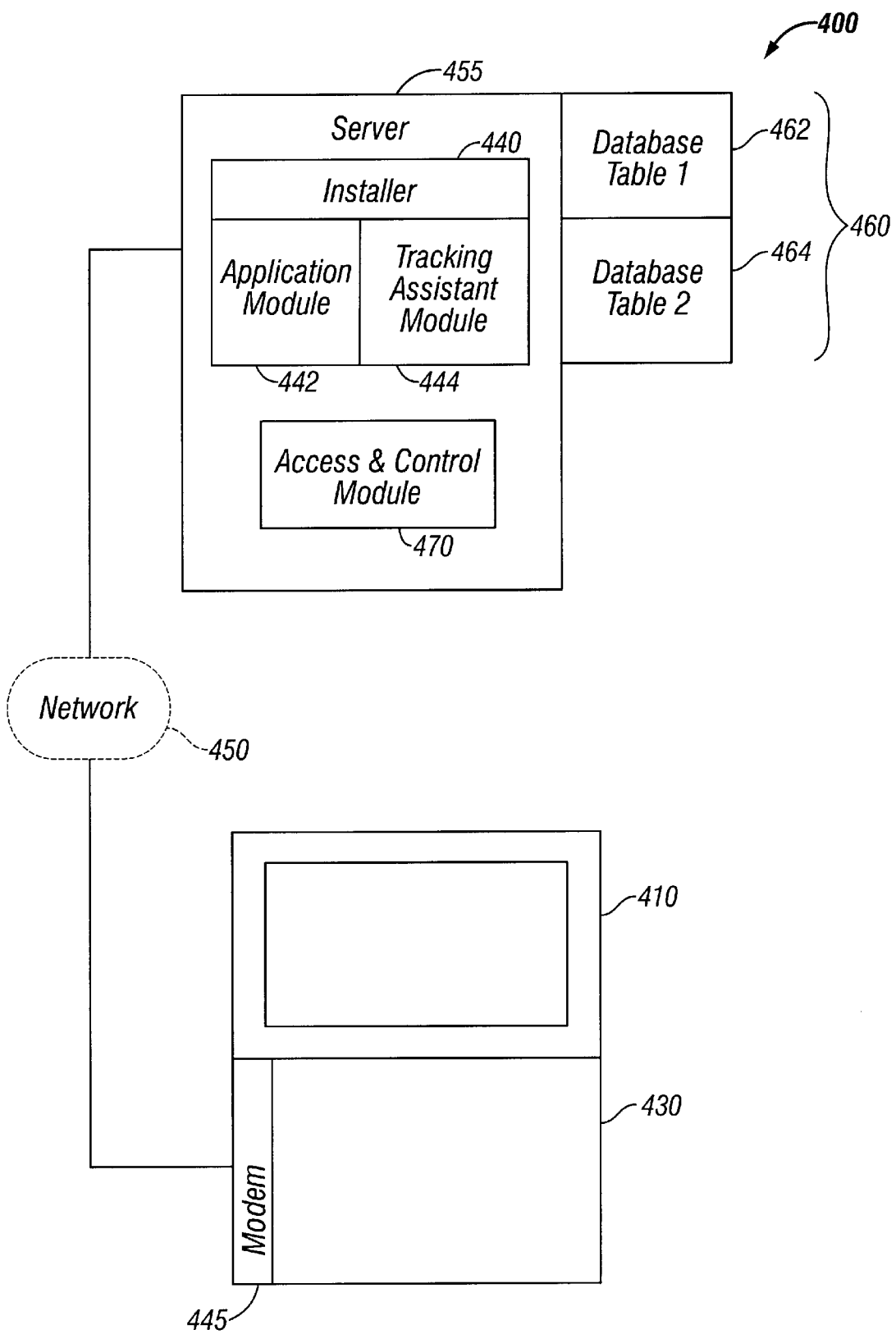
FIG. 1 is an illustrative block diagram of a first embodiment of the present invention.

FIG. 1 is a generalized block diagram of a preferred embodiment 400 of the present invention prior to downloading and installation of software modules in a local computer 410. A server 455 is linked to a computer 410 via an open network 450 such as the Internet. Computer 410 may be a stand alone personal computer, such as a personal computer in a home or office. However, computer 410 may also be part of local area or wide area computer network. A coupling device 445 is used to form a network link between computer 410 and server 455 via network 450. Coupling device 445 may be a conventional modem, T-1 line, or any combination of known elements for coupling computer 410 to network 450. Computer 410 has a hard drive 430 or other memory unit for storing computer programs. These include conventional application programs and utility programs (not shown in FIG. 1).

Server 455 may be any server (e.g., a conventional web server) configured to download an installer module 440 contained in server 455. Installer module 440 includes at least one application module 442 and a tracking assistant module 444. Server 455 also includes an access and control module 470 for controlling the function of server 455. Control module 470 may include any conventional control module used to regulate the function of a server 455. A database 460 comprising first and second database tables 462 and 464 is electronically coupled to server 455. Database 460 may reside within server 455 but may also reside on a separate server. Database 460 may comprise any known memory or data storage unit configured to store database tables.

Referring again to FIG. 1, it can be seen that application module 442 and tracking assistant module 444 are shown as separate elements. It will be understood, however, that the function of tracking assistant module 444 could be incorporated into application module 442 or that tracking assistant module 444 could be coupled or linked to application module 442 using any known method. It will also be understood that while installer module 440 is shown residing within server 455 more generally installer module 440 may be coupled to server 455 using any known method.

Figure 2:
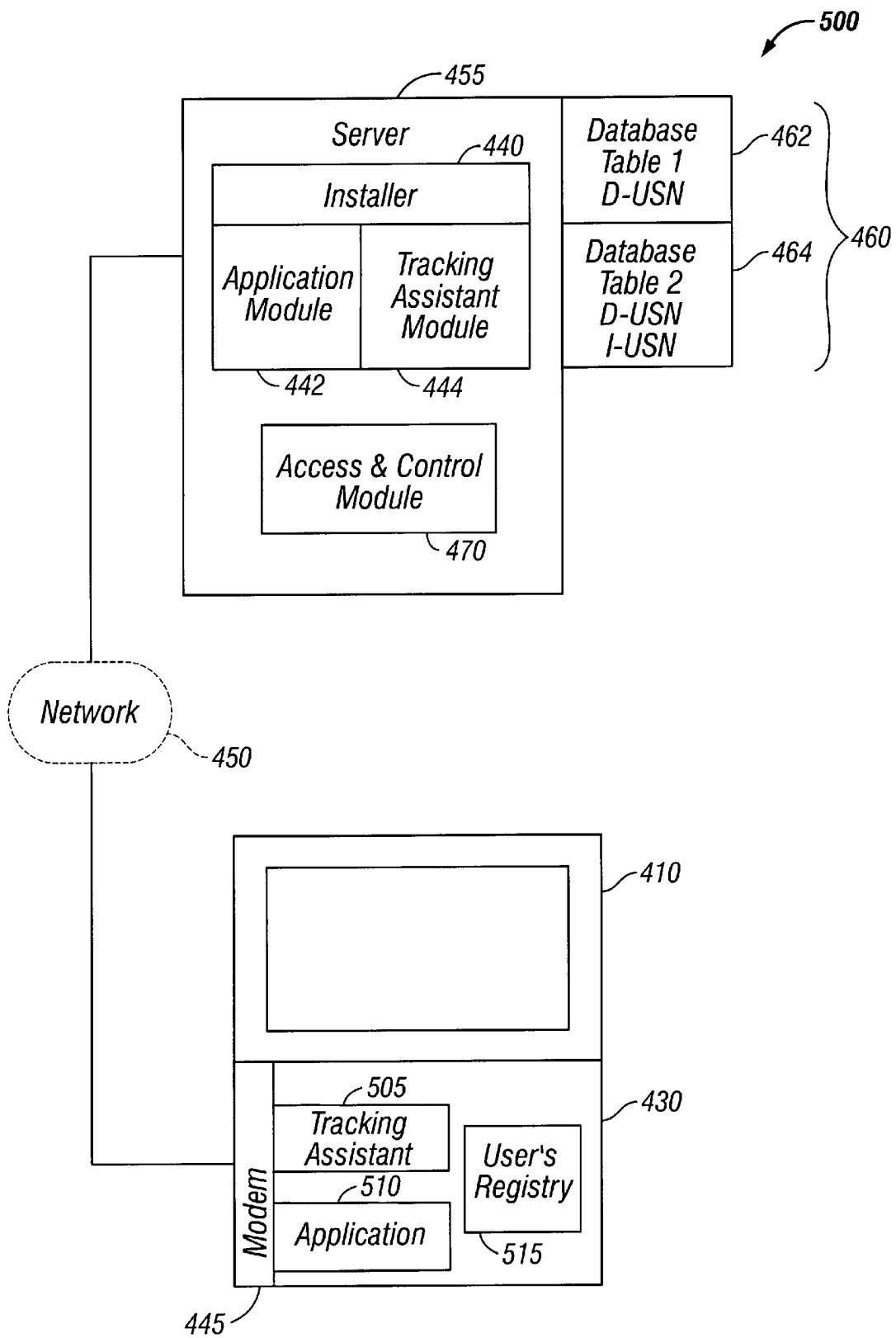
FIG. 2 is an illustrative block diagram showing the server of the present invention with software modules downloaded and installed in a local computer.

FIG. 2 shows an illustrative block diagram of the system 500 with the software downloaded and installed in a local computer 410. Most of the elements are the same as in FIG. 1. Note however that database 462 contains a first identification code which is an identification serial number D-USN (described below) whereas database 464 also contains a second identification code which is an identification serial number I-USN (also described below). In the preferred embodiment, D-USN is a serial number (code) required to install the software application whereas I-USN is a unique serial number (code) created by the installer when the application is installed. The hard drive 430 of the user's computer also contains a tracking assistant 505, corresponding to the downloaded and installed tracking assistant module 444. Additionally, hard drive 430 contains an application 510 corresponding to downloaded and installed application module 442. A file 515 is also shown in FIG. 2. As described below in more detail, file 515 is used to store tracking data. File 515 is a file resident on computer 410. For a WINDOWS® operating system, file 515 is preferably the WINDOWS® user's registry file.

FIGS. 3–6 show a preferred sequence of steps for using the present invention. A preferred use of the present invention is to download an information message management program presently known at the time of filing of this patent application by the inventors by the internal development name of "InfoMessenger" or "IM." InfoMessenger is a program that assists a computer user to manage e-mail messages and documents, such as those acquired from the Internet. However, it will be understood that the present invention may also be practiced with other types of software application modules, including those which do not actively acquire information from the Internet.

Figure 3:
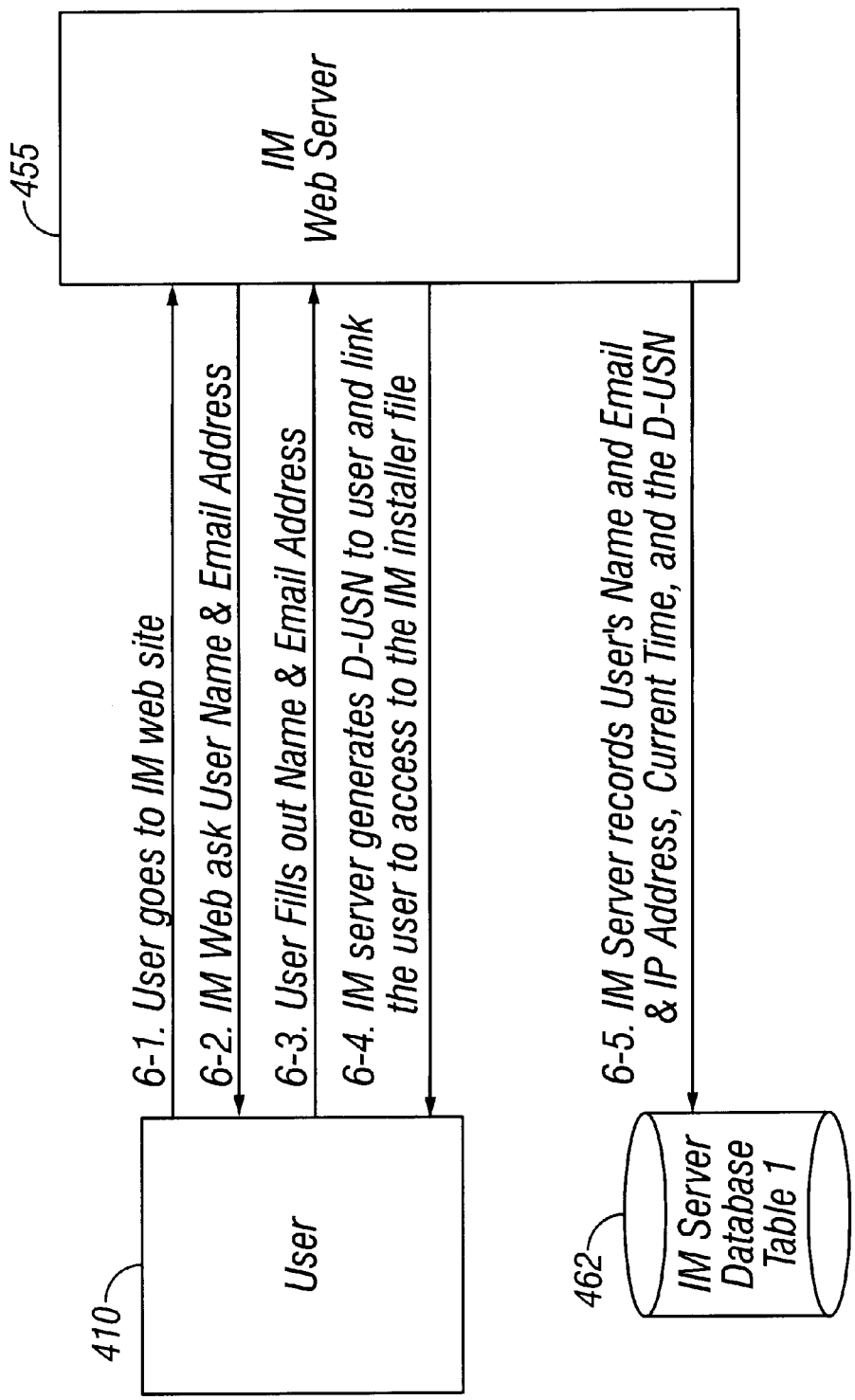
FIG. 3 is an illustrative diagram showing a preferred sequence of steps for downloading an installation module from a web-site.

FIG. 3 shows a first sequence of installation steps to download the installation module from a web site and to record initial registration data. In step 6-1, the user utilizes their computer 410 to access web server 455 via network 450. As previously discussed, network 450 is preferably the Internet but may also be a local or wide area network. In step-6-2 web server 455 preferably asks, preferably via a Web site, the user their name, e-mail address, and/or other registration information. The user then fills out this initial registration information, as shown in step 6-3. Server 455 then generates a download unique serial number (D-USN) and links the user to the installer module 440 file, as'shown in step 6-4. The D-USN may be generated using any conventional algorithm. However, a preferred algorithm-.is described below in more detail. D-USN is an identification code used-to install the software application. As shown in step 6-5, server 455 preferably records the user's name, e-mail address, the current Internet Protocol (IP) address, the current time (preferably measured at server 455), and the D-USN in a first database table 462. Note that at step 6-5 first database table 462 has recorded upon it registration information. It will also be understood that other information obtained from the user may be input along with the user's name and e-mail address. For example, the system may also ask and record responses to queries related to customer service and support, such as "Are you interested in automatically receiving customer support and updates for using this product?"

Figure 4:
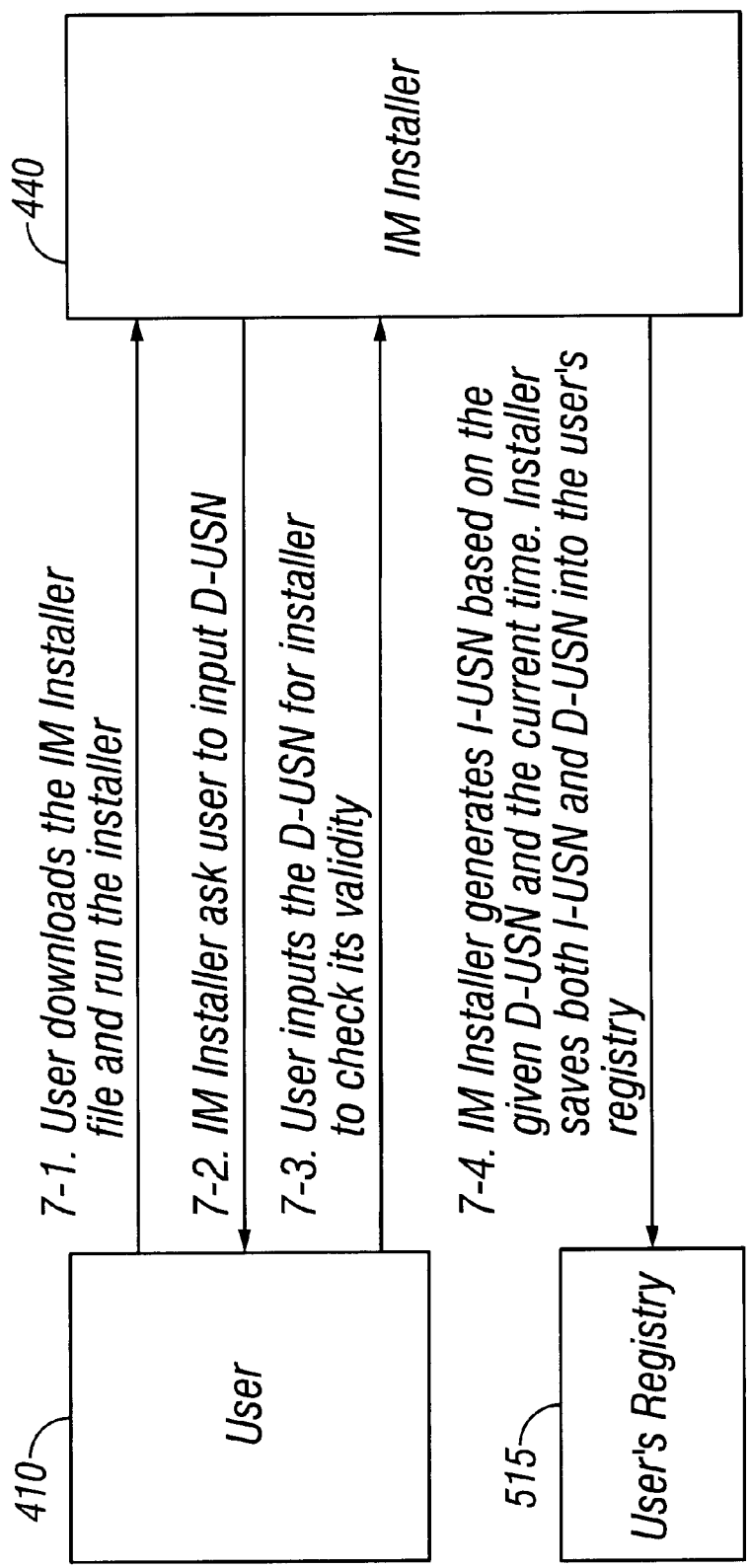
FIG. 4 is an illustrative diagram showing a preferred sequence of steps for installing an application and a tracking assistant of the present invention.

FIG. 4 shows a second sequence of steps for installing the application using installer 440. As shown in step 7-1, when the user runs the downloaded installer 440, installer 440 asks the user to input D-USN, as shown in step 7-2. The user inputs D-USN and installer 440 checks its validity, as shown in step 7-3. Installer 440 generates a second identification code, an installed unique serial number (I-USN), preferably based on D-USN and the current time. A preferred algorithm to create I-USN is described below in more detail. I-USN is a "blind" identification code in that it is preferably not displayed to the user. Installer 440 saves both I-USN and D-USN, preferably in file 515, as shown in step 7-4. For a Windows system, file 515 is preferably the Windows user's registry. The downloaded application 510 is enabled after step 7-4.

Note that should the user share D-USN with others that a different I-USN would automatically be created by installer 440 at the time that the application is installed in another user's computer. For example, if a user shares the application and D-USN to other people who install the application on their own computer then each installed copy on the different computers will have a different I-USN. In the case of a local area network each installed copy will have a different I-USN even if only one application was downloaded from the Internet.

Figure 5:
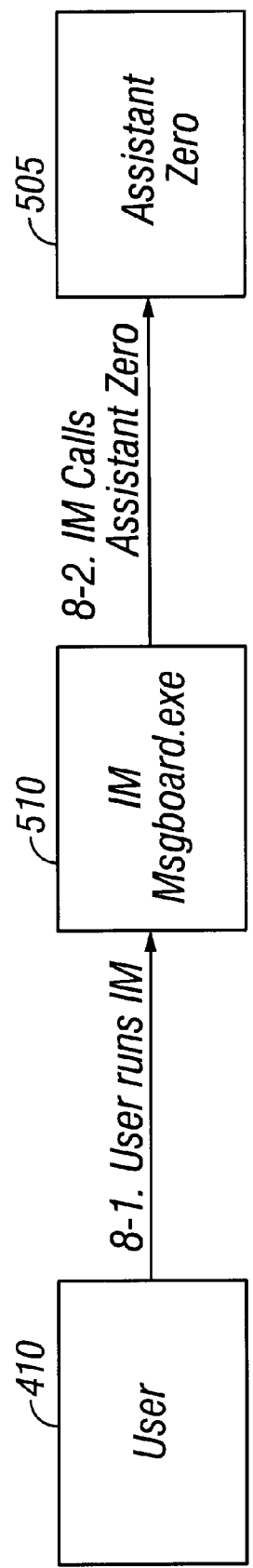
FIG. 5 is an illustrative diagram showing a preferred sequence of steps for an application to initiate the tracking assistant of the present invention.

FIG. 5 shows a preferred sequence of steps upon activation of application 510. When the user at computer 410 launches application 510, application 510 activates tracking assistant 505. As shown in FIG. 5, a preferred tracking assistant is presently known at the time of filing this patent application by the inventors by the internal development name of "Assistant Zero." Tracking assistant 505 monitors the operation of application 510 and is used to send tracking data, which includes D-USN and I-USN, to server 455. Techniques for computer software modules to make an automatic connection a server 455 are known in the context of software applications that search web-sites for articles of interest. Consequently, tracking assistant 505 may contain any software module that automatically forms a network link to a server for communicating data.

Tracking assistant 505 could send tracking data every time application 510 runs and a network 450 link (e.g., Internet access) is available. However, in a preferred method of operation, tracking assistant 505 sends tracking data on a periodic basis, such as once every day that application 510 is in operation. For an application 510 that is automatically connected to the Internet, such as an e-mail message management program, the program will automatically be connected to the Internet every time that application 510 is run. However, more generally application 510 may be a program that does not require access to the Internet. For example, application 510 may be a word processing application installed within a notebook computer that is only intermittently connected to the Internet by the user. Consequently, for applications which do not require access to the Internet for their use, tracking assistant 505 is also preferably programmed to send tracking data dependent on the availability of access to the Internet. For example, tracking assistant 505 may be programmed to send stored tracking data: 1) once each day that the application runs if an Internet connection is available; or 2) at the first available time that computer 410 is coupled to the Internet if more than one day of operation passes without access to the Internet.

Figure 6:
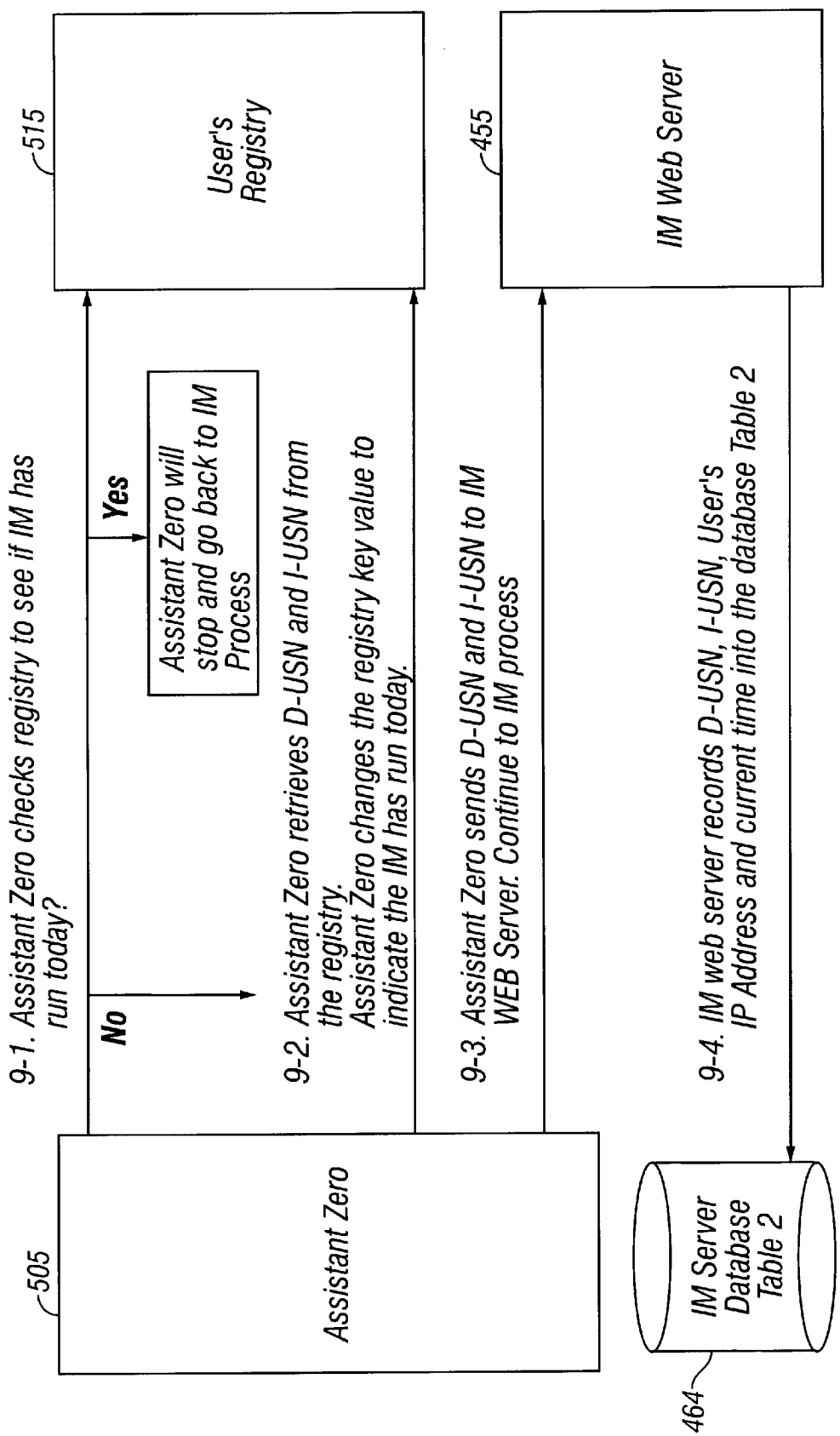
FIG. 6 is an illustrative diagram showing a preferred sequence of steps for the tracking assistant to communicate tracking data to a database coupled to a server.

FIG. 6 shows a sequence of steps illustrating the function of tracking assistant 505. As indicated in FIG. 6, in step 9-1 tracking assistant 505 determines from data stored in file 515 whether application 510 has run within a predefined time schedule or interval (e.g., once a day). As shown in step 9-2, tracking assistant 505 retrieves D-USN and I-USN from file 515. Tracking assistant 505 also changes a registry key value to indicate that the application 510 has run within the predefined time interval. The tracking assistant 505 transmits D-USN and I-USN to server 455, as indicated in step 9-3. As indicated in step 9-4, server 455 receives tracking data that includes D-USN and I-USN. However, as described below in more detail, tracking assistant 505 may also collect and transmit other types of tracking data to server 455 in addition to D-USN and I-USN. This tracking data is stored in second database table 464. As used in this application, each occurrence or event of tracking data received by server 455 is an instance of tracking data, i.e., if one computer transmits D-USN and I-USN as tracking data one hundred times to server 455 then there will be one hundred instances associated with server 455 receiving these one hundred different transmissions of tracking data. For each instance of received tracking data sent by tracking assistant 505 other data related to the instance may also be stored in database table 464. This preferably includes the Internet Protocol (IP) address and the current time of a time stamp (preferably measured at server 455). More generally, server 455 could record for each instance of received tracking data any type of information which may be automatically obtained by virtue of a network link being formed between computer 410 and server 455. The data in database table 464 may be arranged to show for each D-USN the corresponding I-USN for each instance, the time that each instance was received, and other tracking data for each instance.

While the tracking data communicated by tracking assistant 505 to server 455 may contain only D-USN and I-USN, note that tracking assistant 505 may collect other types of tracking data. In particular, tracking assistant 505 could be programed to record other information on the operation of application 510, such as information on the program features most frequently used, the frequency at which various program features are used, the length of time which users typically use a particular application, or other data on the use of application 510. In a preferred embodiment, tracking assistant 505 generates an output file that includes data on how the user uses their application. The output file would preferably be stored in file 515. This tracking data on the use of application 510 could include data on the frequency and length of time that the user uses the application, the user's preference settings, or any another data which may be recorded in an output file. The output file would then be transmitted by tracking assistant 505 along with data on D-USN and I-USN stored in file 515 to server 455. This permits a software vendor to automatically acquire data on how their downloaded application is used.

The present invention provides several benefits to software vendors. One benefit is that the information stored in database 460 may be analyzed to determine if the software is being duplicated. The information stored in database 460 provides information which can be used to assist in determining if illegal copying is occurring and the location(s) where illegal copying may be occurring.

Another benefit of the present invention is that it permits various types of demographic data to be collected. For example, a record of the IP addresses contained with the tracking data stored in second database table 464 provides information indicative of the Internet service provider which was used for each instance. Still another benefit of the present invention is that it facilitates product support. As one example, the present invention assists a vendor to determine how many copies of the application are actually installed. For example, if database 460 contains a record of a particular D-USN that does not have at least one corresponding instance (i.e., a corresponding I-USN stored in second database table 464), it may indicate that the user was unable to successfully install or run the application. This information could, for example, be forwarded to support staff, who may contact the customer regarding providing help installing the program.

The present invention also permits a vendor to acquire information on how the installed software is actually being used. This could include the frequency of use, the time of day of use, the features which are used, and the frequency of use versus time after purchase. This permits, for example, customer service and support personal to target surveys or support to users who infrequently use the program in order to assess potential problems with the software. Alternately, customer service and support may target surveys to frequent users in order to determine what users believe are the most important features of the software program.

Figure 7:
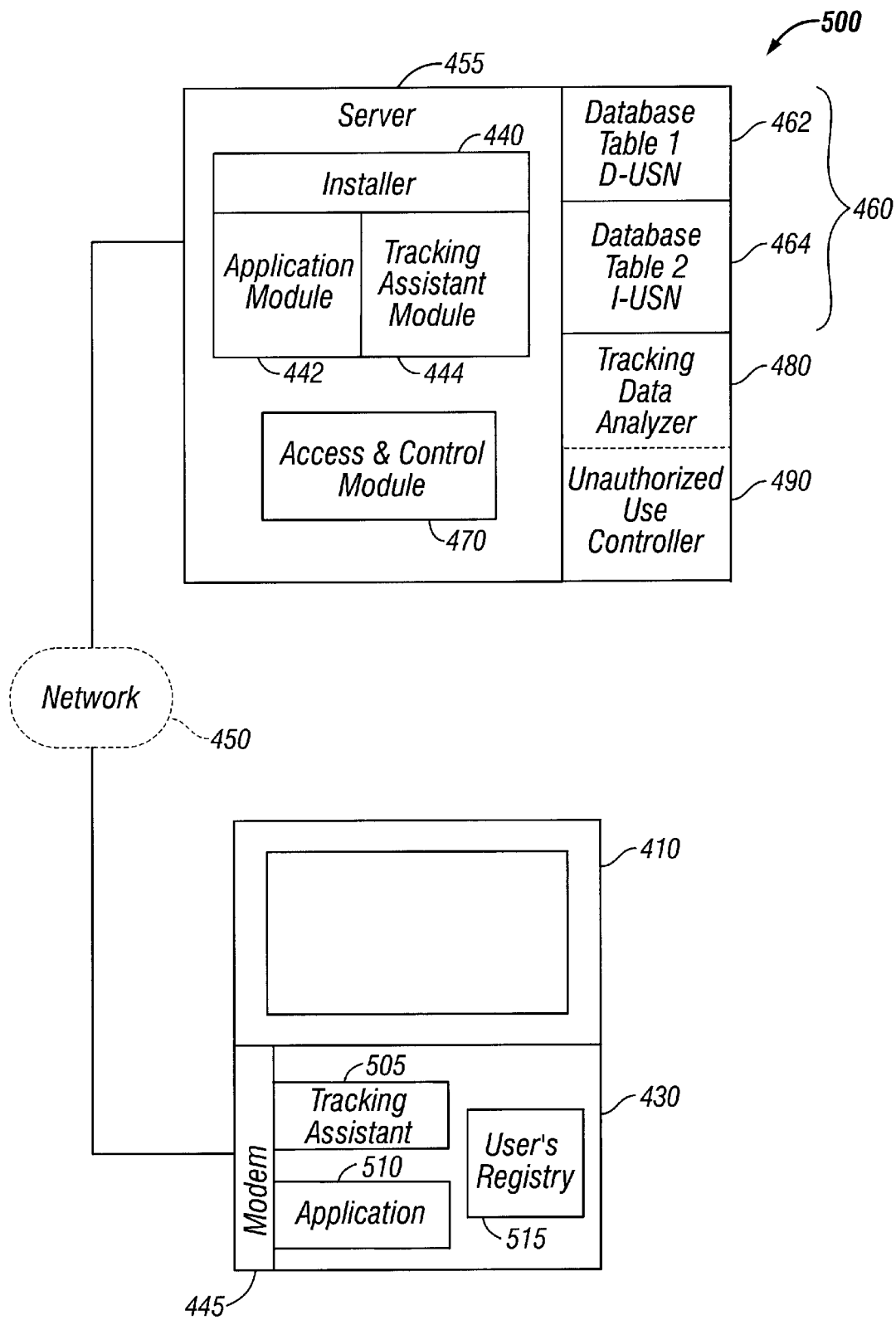
FIG. 7 is an illustrative diagram of a second embodiment of the present invention in which the server performs additional data analysis and control functions.

FIG. 7 shows an alternate embodiment of the present invention in which server 455 includes a tracking data analyzer 480 to analyze data stored in database 460. Data stored in database 460 may be automatically analyzed by tracking data analyzer 480 to determine consumer behavior patterns or to provide information for use by customer service and support. For example, first database table 462 preferably contains not only D-USN but also the user's name and the time that they acquired the software. This data may be used to provide a warranty database or a list of customers who will automatically receive product updates and information on new products. Additionally, a list of users who do not install their application or who use it only infrequently may be created by data analyzer 480 for use in providing customer support. Tracking data analyzer is also preferably programmed to automatically send customer support messages. For example, tracking data analyzer may be programmed to send the message, "Having troubles installing your application? Free customer support hot line open 24 hours a day. Call 1-800-HELP INSTALL" if the user does not successfully install the program after a predefined time interval.

Server 455 may also have an unauthorized use controller 490, acting in response to analyzed data from tracking data analyzer 480, to form an output signal indicative of a possible unauthorized use. Unauthorized use controller 490 may output a warning to the software vendor that a serious copyright violation may exist. For example, if a single D-USN has more than a predetermined number of associated I-USNs, a warning may automatically be sent for action by the vendor. As an illustrative example, controller 490 may be programmed to automatically transmit a warning message if more a predetermined number of I-USNs (e.g., more than one hundred) exist for a single D-USN. Controller 490 may also automatically send warning messages, via e-mail or other means, to suspected unauthorized users.

It will also be understood that tracking assistant 505 and application 510 may further contain any conventional software control program elements which terminate the operation of application 510 upon receipt of a disable command or by the failure to re-enter an enablement code. Consequently, controller 490 may also, in alternate embodiments, contain any know control elements which perform the function of disabling unauthorized versions of application 510 by transmitting a disable command to application 510 or by failure to send an enablement code to application 510.

Generally speaking, while the present invention is particularly directed towards downloaded software, the tracking function may be used for software that is not downloaded from the Internet but which is loaded using other means. In particular, software application module 442 and tracking assistant module 444 could also be installed by loading an installer module 440 stored on a floppy disk or a CD-ROM.

Figure 8:
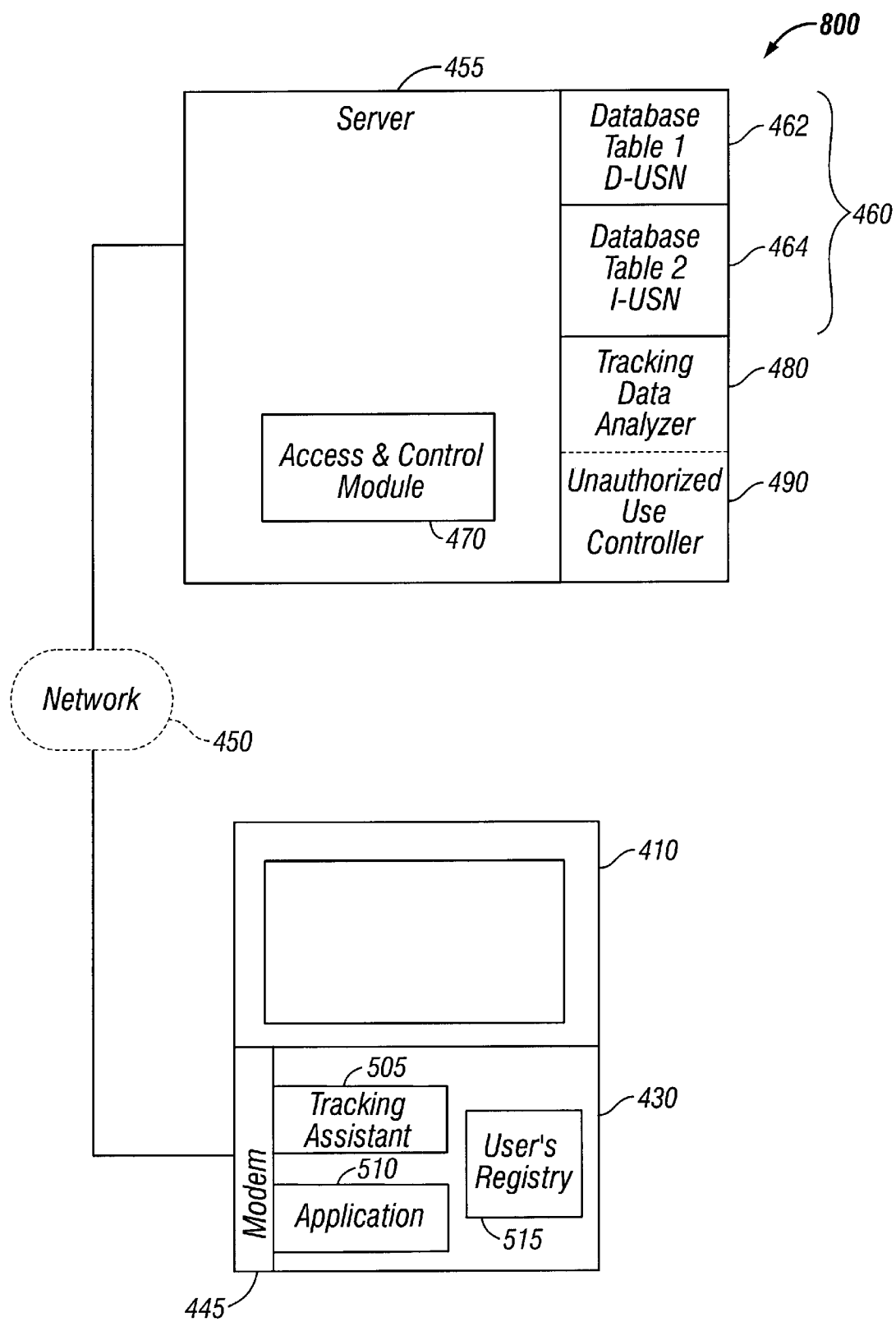
FIG. 8 is an illustrative diagram of a third embodiment of the present invention in which the server which receives tracking data does not download the software application.

FIG. 8 shows an embodiment of the invention in which server 455 does not contain an application that is downloaded. In the embodiment shown in FIG. 8 the user may have installed application 510 and tracking assistant 505 in any conventional way, such as by loading an installer module 440 stored on a floppy disk or a compact disk. For this embodiment, D-USN may be provided in any conventional way. However, for software that is not downloaded the inventors have developed a number of different ways to provide a D-USN. First, the software may be sold with a printed D-USN serial number which the user inputs as part of the process of installing application 510 and tracking assistant 505. Second, D-USN may be embedded in the application program. This requires a so-called "packing program" to put application 510 and D-USN together. Third, D-USN may be automatically retrieved from server 455 via network 450. This requires that a network connection is automatically made when the user installs the application. The installer program would subsequently generate and record an I-USN at the time of installation in a similar manner to that previously described for downloaded software.

The capability of the present invention to track the number of actual copies of an application 510 in regular use may be used by a software vendor in a variety of beneficial ways. As one example, some types of software, particular those related to use of the Internet, are sometimes given away free to users. One economic value to software vendors of free distributable software may come from advertisements that the application launches or displays whenever the application is run. For example, some programs display an advertisement banner every time that the user launches the application. The software vendor may be paid a fee by the advertiser based upon how many copies of the application are distributed. Unauthorized copies reduce the distribution count, and thus may result in lost advertising revenues. For example, if on average half of the copies in actual use are made and shared by users then the software vendor would ordinarily obtain an adverting fee based upon only half the actual number of copies of the application in use. Using the present invention, however, a software vendor could generate an accurate count of the total number of copies of their application in use, which may permit them to significantly increase advertising revenues. Additionally, using the present invention a software vendor could arrange to be paid an advertising fee based upon the number of times that the application is run by each user, i.e., a fee based upon the number of times that the advertisement is displayed to users. This use of the present invention may be applied to the Internet, local area networks, or wide area networks.

Another economic benefit of free distributable software is related to its value as a marketing tool for software vendors. Software vendors may provide free distributable software in order to develop a customer base for other products and services that they sell. For example, software vendors may acquire registration information from those to whom they give the free distributable software in order to assist the software vendor to market other products and services. Additionally, the free distributable software may contain software features which familiarize potential customers with some of the software functions of other products or services sold by the software vendor. However, unauthorized copying of free distributable software may result in corrupted versions of the free distributable software which crash or do not run well. Additionally, unauthorized copying of free distributable software may hinder a software vendor from acquiring information on potential customers for other products and services. Using the present invention, however, a software vendor could obtain information on the usage of free distributable software which would help them to more efficiently use such free distributable software as a marketing tool. For example, programming tracking assistant 505 could be programmed to record and transmit information on the usage of product features similar to those used in other products and services sold by the software vendor. This information would assist a software vendor to design free distributable software which promotes the sale of other products and services. Additionally, the software vendor could acquire demographic data which would assist them to more efficiently focus their marketing efforts. Moreover, the ability to monitor unauthorized copying of the free distributable software would also assist a software vendor to take measures, if necessary, to prevent corrupted unauthorized copies of free distributable software from tarnishing their reputation.

Another application of the present invention is to monitor the use of software in local area network applications. As one example, software applications are often licensed to corporate users based upon the number of copies of the application used in the local area network. One D-USN could be provide to the users of the local are network along with access to the installer module 440. Each installed copy would have the same D-USN but a different I-USN. The software vendor could track how many copies of the application were made or used in order to determine if the corporate client remains within the terms of its license agreement. Alternately, a surcharge could automatically be charged if the local area network increases the number of copies of the application in regular use beyond a predetermined threshold. Moreover, demographic data related to particular types of users could be automatically collected and analyzed. For example, where the software vendor keeps a record of the D-USN given to each local area network group, tracking assistant 505 would supply tracking data for each user in the local area network. This permits the software vendor to compare the use of their application at different local area network sites. For example, data on the frequency of use, length of use, features used, and user preferences sent by tracking assistant 505 for each user in a law firm may be different than those in an engineering company.

For the case of a wide area network, such as an Internet user group, the present invention may be used to facilitate tracking the usage of a software product used in the wide area network. A wide area network is typically operated or controlled by a single organization. The controlling organization is often interested in monitoring or regulating the use of the services it provides. As one example, a group of Internet users, such as a group of users using the same Internet Service Provider may use a common software application for online chatting or paging within the group. Using the present invention, the Internet Service Provider could track the use of the software application. This would facilitate tracking the use of the software application to determine how the application is being used. The present invention could be used to determine if member users share the application with non-members. Additionally, as described above, the present invention could also be used to terminate unauthorized versions of the application.

The algorithms for generating D-USN and I-USN could be implemented in many different ways. However, D-USN is preferably an identification code that has quasi-random attributes. I-USN is preferably an identification code which is related to D-USN and which also has quasi-random attributes. The inventors have developed a preferred algorithm for generating D-USN and I-USN which is comparatively simple and efficient.

For the case of downloaded software the first identification code, D-USN, is automatically given to a user who requests downloading of the application. It is preferably 9 characters in length, with each alphanumeric character having one of 36 possible numeric values corresponding to 0–9 and A–Z. Each letter has a corresponding numeric value, i.e., "A" has a value of 10, "B" has a value of 11, . . . and "Z" has a value of 35. An illustrative D-USN would be the identification code "RHR5D39ET."

The 9 character alphanumeric code preferably derives part of its characters from an identification code obtained from a database and the remaining portion of its character created as a function of the time when it was downloaded. In a preferred implementation, 4 characters are derived from a 6 digit identification code and the remaining 5 characters are derived as a function of the time that the installer is downloaded.

A modulus method is preferably used to convert the initial 6 digit identification code of the database into a 4 digit string of characters. As used in this application, the modulus is the remainder after the division. As an example consider 999 divided by 36. 999/36=27, with a remainder of 17. This can be expressed mathematically as 999%36=17.

As an example of the modulus method of the present invention, consider a database identification code of 999987. It is preferably split into two strings of 3 digits, for example: 999987→999 987. Each 3 digit string is converted into a 36 value character by calculating its dividend and modulus. For example: 999987 is split into two three-digit strings: 999987→999 987. The dividend is calculated by dividing each string by the number thirty six. For example, the dividend of 999 is 999/36 27. The number "27" corresponds to the letter "R" in a 36 character alphanumeric system. The modulus is calculated from the remainder of the division. The remainder of the division in this example is 27, since 999−36·27=27. So the modulus=999%36=27, which also corresponds to the alphanumeric character R. Consequently, the three digit string "999" corresponds to the two character alphanumeric string "RR." The same method applied to the three digit string 987 results in the two character alphanumeric string "RF." Thus, the six digit database code "999987" from the initial identification code is converted to the four character alphanumeric code "RRRF"

The remaining 5 alphanumeric characters of D-USN are calculated from the downloading time. A preferred method to create a nine digit time code is to take the absolute value of the difference between the time when downloaded and another time. For example, a 9 digit code results by taking the difference between the downloading time to the beginning of 12/31/2025 and converting the result into seconds. For example, there are "836471338" seconds from 6/29/1999, 14:51:02, to 12/31/2005. This 9 digit string is split into three groups of three digits. Each three digit string is converted into two alphanumeric characters using the same method described above by taking the dividend and modulus relative to 36. This results in a six character alphanumeric code. Using the same method as above, 836471338 results in the six character alphanumeric code of N8D39E. This six character code is then cut to four digits by taking only the last four characters, i.e., "D39E." A last (fifth) character is created as a validation character. To create the last character the numerical value of all of the alphanumeric characters is added up. So in the previous example, the numerical value of each of the characters (R+R+R+F)+(D+3+9+E)=135. The validation number is selected by calculating the modulus of the sum for dividing by 36 (115%36=27) and subtracting this modulus from 36 to find the numeric value of the alphanumeric validation character. In the illustrative example, a modulus of 7 for the sum of the 8 characters results in 36−27=9, which corresponds to a validation character of "9." Consequently, the D-USN code of "RRRFD39E9" will result. To validate the D-USN, the installer will sum up the numeric value of the 9 characters and determine if the resultant sum can be divided by 36. For example, the D-USN code of "R+H+R+5+D+3+9+E+T"= 144, check if 144%36=0. If the modulus of the sum % 36=0 the D-USN the installation is validated, otherwise, the installer will not continue.

The I-USN code is generated by installer 440 and saved in the user's registry. It is preferably 13 alphanumeric characters in length, where each character has the value 0–9, A–Z. The first 9 characters are preferably derived from D-USN and the last 4 digits from the time of installation. These first 9 characters, derived from D-USN, are preferably acquired when the user inserts D-USN to begin the installation process.

The last four characters of I-USN are derived from the time at installation. A preferred method is to take the format of the time (during installation) and to discard the year, month and date part. This leaves only the hour, minute, and second, which is expressed in conventional digital form as hh:mm:ss, where hh are the hours, mm are the minutes, and ss are the seconds. This six digit code is preferably split into two three digit codes. Thus, "hhmmss", is split into "hhm" "mss." As an example: 04:19:48 becomes "041", "948." For each of the three digit numbers, the dividend and modulus is calculated, using the same as the method above, to produce four alphanumeric characters. In the above example, 041→"17" and 948→"QC" so that the six digits of the hours, minutes, and seconds of 04:19:48 is converted into the four character alphanumeric code of "17QC." Thus, if the time when the installer is used is 12/31/1999, 04:19:48, with a D-USN of "RHR5D39E", the resulting I-USN is: "RHR5D39ET-17QC."

Although a preferred embodiment of the present invention and modifications thereof have been described in detail herein, it is to be understood that this invention is not limited to those precise embodiments and modifications, and that other modifications and variations may be affected by one of ordinary skill in the art without departing from the spirit and scope of the invention as defined in the appended claims.

What is claimed is:

1. A system for tracking the use of downloaded software, comprising:
    (a) a server for providing a software program remotely, said server configured to generate a first identification code in response to a request to download software;
    (b) a downloadable installer module coupled to said server for installing downloaded software in a computer in response to entry of said first identification code and registration data, said installer module including:
        (i) a software application program; and
        (ii) a tracking assistant configured to automatically transmit tracking data indicative of the operation of said application program module;
    said installer module generating a second identification code when said application program is installed in said user's computer; and
    (c) a database coupled to said server for storing said tracking data;
        wherein said tracking data includes said first and said second identification codes.

2. The system of claim 1 wherein said server records the time whenever said tracking data is received by said server.

3. The system of claim 2, wherein said tracking data is transmitted via the Internet and said server records the Internet Protocol address whenever said tracking data is received by said server.

4. The system of claim 1, wherein said server automatically records said first code and registration data in said database in response to the user requesting said software application program be downloaded.

5. The system of claim 1, wherein said second code is a function of said first code and the time of installation.

6. The system of claim 1, wherein said tracking assistant transmits said first and second codes according to a predetermined schedule.

7. The system of claim 1, further comprising a data analyzer coupled to said database to automatically analyze data stored in said database.

8. The system of claim 7, wherein said data analyzer is configured to automatically perform at least one customer support function.

9. The system of claim 7, wherein said data analyzer is configured to analyze the use of said downloaded software program application and to determine users which need additional customer support.

10. The system of claim 7, further comprising a controller coupled to said data analyzer having an output indicative of unauthorized copying of said software application program.

11. The system of claim 10, wherein the operation of said application program may be terminated by said server and wherein said controller is programmed to terminate the operation of unauthorized copies of said software application program.

12. A system for tracking the use of software, comprising:
    (a) a computer;
    (b) a software application program residing on said computer;
    (c) a tracking assistant residing on said computer for automatically transmitting tracking data indicative of the operation of said application program;
    (d) a server having a database; and
    (e) a network for communicating said tracking data to said database;
        wherein said tracking data includes a first identification code and a second identification code which is generated by said computer when said application is installed in said computer.

13. The system of claim 12, wherein said tracking assistant is configured to automatically record tracking data on the operation of said application program.

14. The system of claim 12, wherein said tracking data is sent to said server according to a predetermined schedule.

15. The system of claim 14, wherein said schedule is a function of the operation of said application program.

16. The system of claim 12, wherein said tracking data is sent to said server on a schedule depending upon access to said network.

17. A method of tracking the use of computer software, comprising the steps of:

(a) providing a computer;

(b) providing an installer having a software application and a tracking assistant configured to record and transmit data on the operation of said application;

(c) providing a first identification code;

(d) entering said first identification code to install said software application and said tracking assistant;

(e) generating a second identification code;

(f) recording said first and second identification codes in a portion of the memory of said computer; and (g) periodically communicating said first and said second identification codes to the database of a remote server via said tracking assistant;

wherein said tracking assistant module automatically activates a network link to transmit said codes to said server.

18. The method of claim 17, wherein said installer is downloaded from a web site connected to the Internet.

19. The method of claim 17, wherein said first identification code is a function of the time at which said installer is downloaded.

20. The method of claim 17, wherein said server generates said first identification code and further comprising the step of recording said first code and the time at which the installer is downloaded in said database.

21. The method of claim 17, wherein said second identification code is a function of said first identification code.

22. The method of claim 17, wherein said server includes a data analyzer and further comprising the step of analyzing instances of said first and second codes in said database to determine if duplicate copies of the software application have been installed.

23. The method of claim 17, further comprising the steps of:

providing a data analyzer to analyze data stored in said database; and supplying customer service to users based upon the frequency at which the user utilizes said software application module.

24. The method of claim 17, further comprising the steps of:

providing a data analyzer and controller to determine unauthorized use of said application module; and disabling unauthorized versions of said software application module.

25. The method of claim 17, wherein said tracking assistant is configured to record data on the operation of said application and further comprising the step of transmitting said data along with said first and second identification codes to said server.

26. The method of claim 17, wherein said computer is coupled to a local area network and further comprising the step of calculating the number of installed applications in said local area network.

27. The method of claim 17, wherein said computer is coupled to a wide area network and further comprising the step of monitoring the use of said application within a group of wide area network users.

28. A method of tracking computer software, comprising the steps of:

(a) providing a server containing a database and a downloadable installer;

(b) providing a computer;

(c) accessing a web site coupled to said server via an Internet link;

(d) downloading a first identification code from said web site;

(e) downloading from said web site said installer into the computer memory of said computer, said installer module having a software application and a tracking assistant;

(f) inserting said first identification code to said installer to install said software application and said tracking assistant module in said computer;

(g) generating a second identification code which is a function of the time said software application module is installed;

(h) recording said first and second identification codes in a portion of the memory of said computer; and (i) transmitting said first and said second identification codes to the database of said server according to a schedule which is a function of the operation of said software application;

wherein said tracking assistant is configured to automatically activate an Internet connection to transmit said codes to said web-server.

29. The method of claim 28 wherein said identification codes are transmitted to said server according to a predetermined schedule and wherein said server records the time at which said codes are received.

30. The method of claim 28, further comprising the steps of:

storing data on the use of said application as tracking data; and transmitting said tracking data when said codes are transmitted.

31. The method of claim 28, further comprising the steps of:

storing data on the use of said application as tracking data; and transmitting said tracking data when said codes are transmitted.

32. A system for tracking the use of software, comprising:

(a) a computer;

(b) a software application program residing on said computer;

(c) a tracking assistant residing on said computer for automatically transmitting tracking data indicative of the operation of said application program;

(d) a server having a database; and (e) a network for communicating said tracking data to said database;

wherein said tracking data includes a first identification code and a second identification code which is generated by said computer when said application is installed in said computer;

wherein said tracking assistant is configured to automatically record tracking data on the operation of said application program; and wherein said tracking data is recorded in an output file, said output file including data selected from a group consisting of: the frequency said application program is used; the length of time said application program is used; user preferences of said application program; and use of at least one feature of said application program.

33. A method of tracking the use of computer software, comprising the steps of:
   (a) providing a computer;
   (b) providing an installer having a software application and a tracking assistant configured to record and transmit data on the operation of said application;
   (c) providing a first identification code;
   (d) entering said first identification code to install said software application and said tracking assistant;
   (e) generating a second identification code;
   (f) recording said first and second identification codes in a portion of the memory of said computer; and
   (g) periodically communicating said first and said second identification codes to the database of a remote server via said tracking assistant;
      wherein said tracking assistant module automatically activates a network link to transmit said codes to said server; and
      wherein said server records the time at which it receives said first and said second identification codes, and the method further comprises a step of:
   (h) analyzing the frequency at which said software application is used.

34. A method of tracking the use of computer software, comprising the steps of:
   (a) providing a computer;
   (b) providing an installer having a software application and a tracking assistant configured to record and transmit data on the operation of said application;
   (c) providing a first identification code;
   (d) entering said first identification code to install said software application and said tracking assistant;
   (e) generating a second identification code;
   (f) recording said first and second identification codes in a portion of the memory of said computer; and
   (g) periodically communicating said first and said second identification codes to the database of a remote server via said tracking assistant;
      wherein said tracking assistant module automatically activates a network link to transmit said codes to said server; and
      wherein said software application is configured to display an advertisement, and the method further comprising a step of:
   (h) using said tracking data to calculate a fee charged to an advertiser.

* * * * *